May 11, 1971  C. J. TRZYNA ET AL  3,578,574
ELECTROLYTIC MATERIAL REMOVAL PROCESS AND APPARATUS
Filed Oct. 18, 1965  3 Sheets-Sheet 1
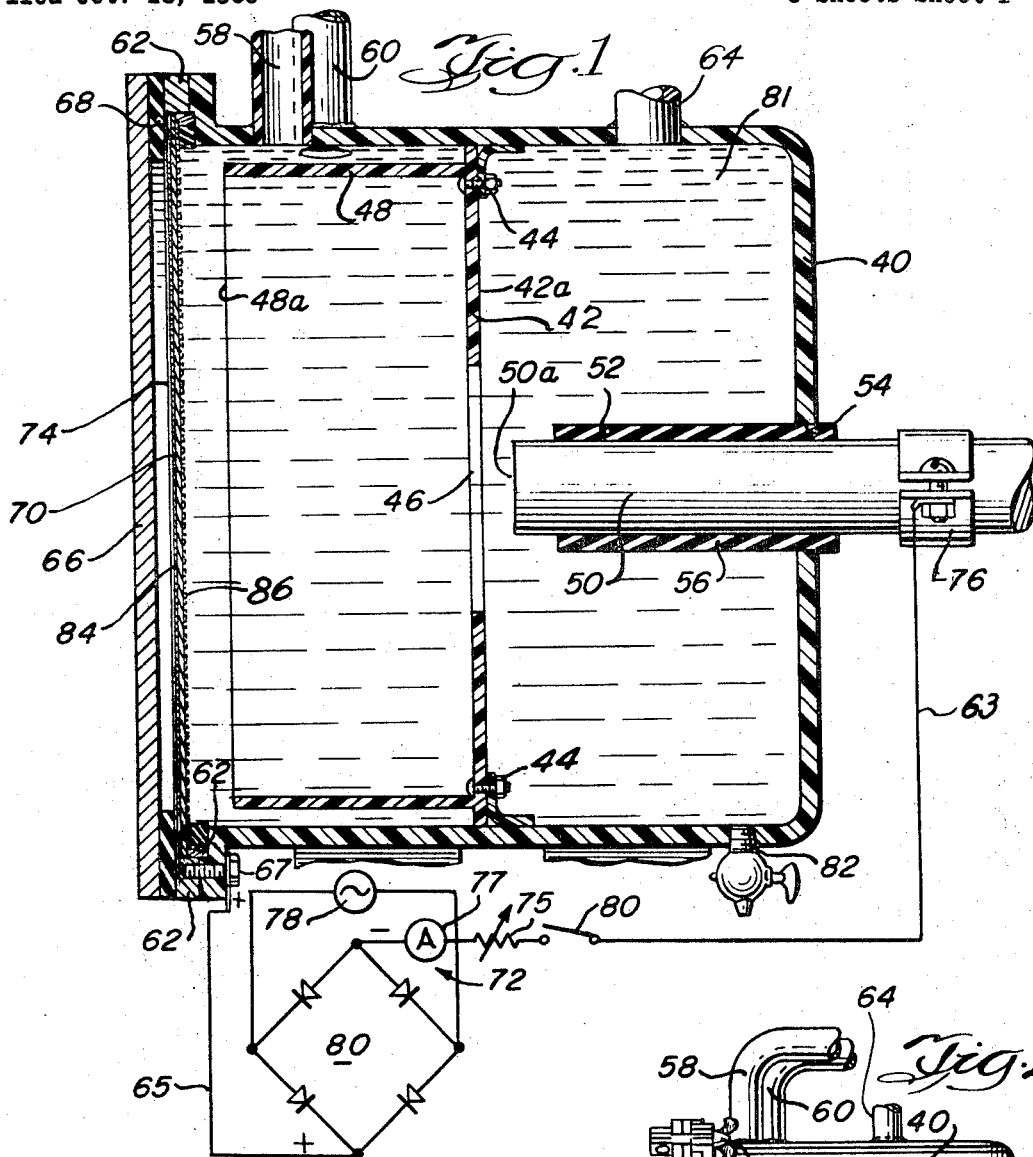
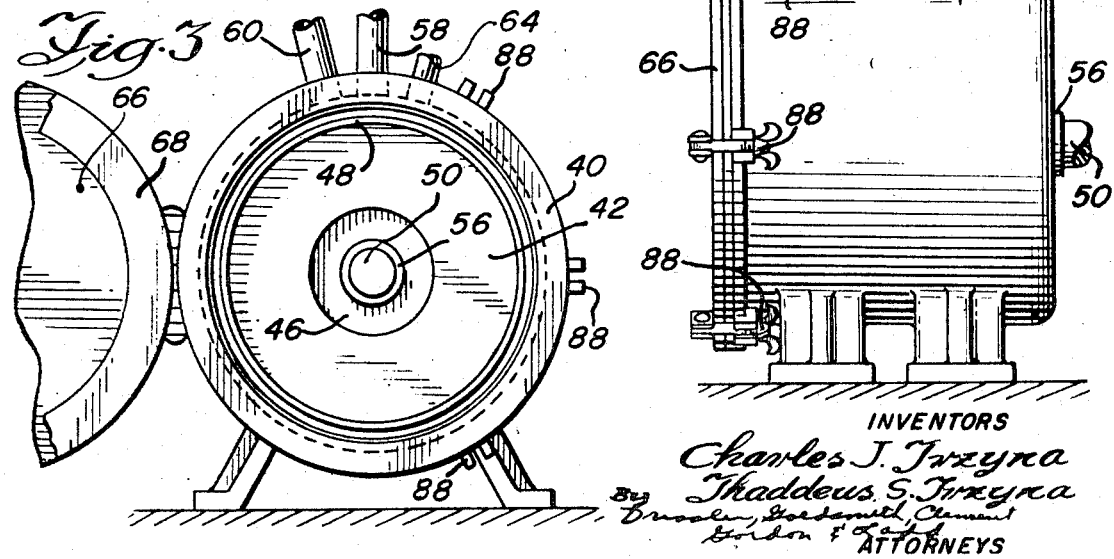
INVENTORS
Charles J. Trzyna
Thaddeus S. Trzyna
By Brooks, Goldsmith, Clement
Gordon & Lott
ATTORNEYS INVENTORS
Charles J. Trzyna
Thaddeus S. Trzyna
BY Dressler, Goldsmith, Clement, Gordon & Shea
ATTORNEYS

United States Patent Office

3,578,574
Patented May 11, 1971

3,578,574
ELECTROLYTIC MATERIAL REMOVAL PROCESS
AND APPARATUS
Charles J. Trzyna, Long Grove, Ill., and Thaddeus S.
Trzyna, Pasadena, Calif., assignors to Electronic
Precision Industries Corporation, Inc.
Filed Oct. 18, 1965, Ser. No. 497,089
Int. Cl. B23p 1/00
U.S. Cl. 204—143
5 Claims

ABSTRACT OF THE DISCLOSURE

A process for removing material from metal articles and for perforating metal articles using an electrolytical material removal technique.

---

This invention relates to a novel process and apparatus for perforating articles. Since the present invention is very useful in the field of color television picture tubes, it will be generally described in conjunction with the manufacture of color television aperture masks. However, it is to be understood that aperture masks are but an illustrative example of the numerous products to which the present invention can apply.

The picture tubes for color television receivers in general use today include a luminescent screen or "target" which comprises a large number of phosphor dots, an aperture mask having a large number of apertures for selectively directing an electron beam or beams onto the luminescent screen to excite selective phosphor dots, and an electron gun system which effectively provides three separate electron beams.

The luminescent screen generally consists of a large number of phosphor dot triads disposed in a mosaic layer on the face plate of a cathode ray tube. Each of the triads includes a red, a green and a blue phosphor dot. The dots of each triad are tangent to each other, and are positioned in the form of an equilateral triangle. The luminescent screen formed by these phosphor dot triads generally contains upwards of 100 triads (or 300 dots) per square inch. As an example, a 100 square inch portion of a conventional screen contains almost 200,000 triads or 600,000 separate dots.

The aperture mask has the same number of apertures as the number of triads. The mask is positioned with respect to the screen so that each aperture will selectively direct an electron beam from the electron gun system through the aperture mask to impinge upon a selective phosphor dot. By directing the beam through a selective aperture at a predetermined angle, the beam will impinge upon one of the dots of a triad, thereby exciting the dot and causing it to give off energy at a particular frequency. If, for example, only the red dot of a triad is excited, the triad will only emit the color red; however, other colors can be presented if more than one of the three dots of the triad are excited concurrently.

In order to give the desired color reproduction it is very important that each beam be directed by the aperture mask to impinge upon a selective phosphor dot, and any misalignment may cause excitation of the wrong dot of the triad, in addition to or in lieu of the selected dot. It is apparent that such misalignment will result in the presentation of an improper hue or the wrong color entirely. It is also important that all of the necessary color dots be excited, without the loss of an electron beam in transmission.

Imperfect transmission of the electron beams to the respective dots has been a serious problem with prior art aperture masks. As a result of prior art manufacturing techniques, the walls defining each of the apertures are shaped in a manner which permits many of the electron beams to be deflected or scattered in their path through the aperture mask and either "bounced" back in the direction of the gun system or directed toward the wrong dot, or even the wrong dot triad. These prior art production techniques, which involve chemically etching the mask in a fluid to obtain the apertures, provide apertures which have smaller surface openings than the vacant portion below the surface. In other words, the prior art production techniques cause the metal mask surface to be undercut. Since the surface opening of the aperture is smaller than the vacant portions below (toward the electron gun system) the electron beam may hit the wall defining the aperture and be deflected in an undesirable manner. The deflection problem becomes progressively severe toward the outer edges of the screen, because of the angle at which the electron beam travels with respect to the aperture mask.

Another problem resulting from the undercutting due to prior art production techniques is the disability to provide apertures which are very close to one another, yet separated completely by the material of which the mask is formed. If very close positioning of apertures were attempted, the apertures would merge with one another and be ineffective to provide the necessary direction to the electron beam. This problem is an acute one, because an optimum colored presentation is effected by the use of a maximum amount of very small phosphor dot triads, positioned very closely to one another. The apertures of prior art aperture masks have had to remain at a distance from one another that is much farther than optimum.

A further problem in the use of prior art production techniques has occurred where aperture masks having apertures of various shapes and sizes are desired. Since the prior art production techniques involve chemical etching, apertures having a relatively large cross-sectional configuration are etched at a different rate than other, smaller apertures in the same workpiece. As a result of an inherent lack of control of the etching rate when using prior art techniques, the final configurations of the various apertures cannot be predicted with any precision.

The above problems are obviated by the process and apparatus of the present invention, which allows precise control in the removal of material from the work-piece and which produces apertures defined by walls that are not undercut.

The aperture masks produced by the method and apparatus of the present invention contain apertures which are dimensioned to lessen greatly the problem of electron beam deflection or scattering. Additionally, the apertures may be positioned very close to one another to achieve optimum results. As distinguished from the apertures in prior art aperture masks, the apertures in the masks produced by the method and apparatus of the present invention are dimensioned so that the maximum distance between opposite points on the walls defining each of the apertures is at the surface of the mask which faces the viewer (toward the target). In this manner the electron beam is not likely to scatter, and the apertures can be positioned extremely close to one another without merging.

In the novel process of the present invention, a metal article to be perforated is partially covered with a non-conductive substance. Only the portions of the article to be removed are not covered with the substance. The article is then immersed in an electrolytic solution and is connected to a source of current to form an anode.

Also immersed in the electrolytic solution is another electrode, which is connected to the source of current to form a cathode. Ion flow through the electrolyte is then commenced, to cause the uncovered portions of the article to be removed.

In accordance with the illustrative embodiment of the method of the present invention, the aperture pattern is photographically transferred to an electrically conductive sheet (workpiece) which is coated with a photoresist. A photoresist is a non-conductive material which, when exposed to light, polymerizes and remains affixed to the sheet while the unexposed (or unpolymerized) portions of the photoresist are washed away.

The photoresist-coated sheet is exposed to light through a mask so that the unexposed portions of the photoresist correspond to the desired apertures. The workpiece is then immersed in an electrolyte contained within a housing. Also immersed in the electrolyte is an electrically conductive, generally cylindrical rod having its axis coincident with the central axis of the portion of the workpiece that is to be perforated. To obtain uniformity of perforating, the rod has a cross-sectional area that is smaller than the surface area of the portion of the workpiece to be perforated.

A suitable source of direct current (or rectified A.C.) is provided, with the workpiece forming the anode and the metal rod forming the cathode. When current is supplied to the system, apertures are formed at the portions of the workpiece where the photoresist material has been washed away. These electrolytically formed apertures have the largest cross-sectional area at a surface of the workpiece, not at a depth beneath the surface as with prior art aperture masks. The remaining photoresist is then removed to complete the operation.

A more detailed explanation of the invention is provided in the following description, taken together with the accompanying drawings, in which:

FIG. 1 is an elevational view, taken partially in cross-section, of an apparatus for making aperture masks, with a current supply shown in schematic form;

FIG. 2 is a side elevational view of the apparatus of FIG. 1;

FIG. 3 is a front view of the apparatus of FIG. 1 with the enclosure removed;

Figure 5:
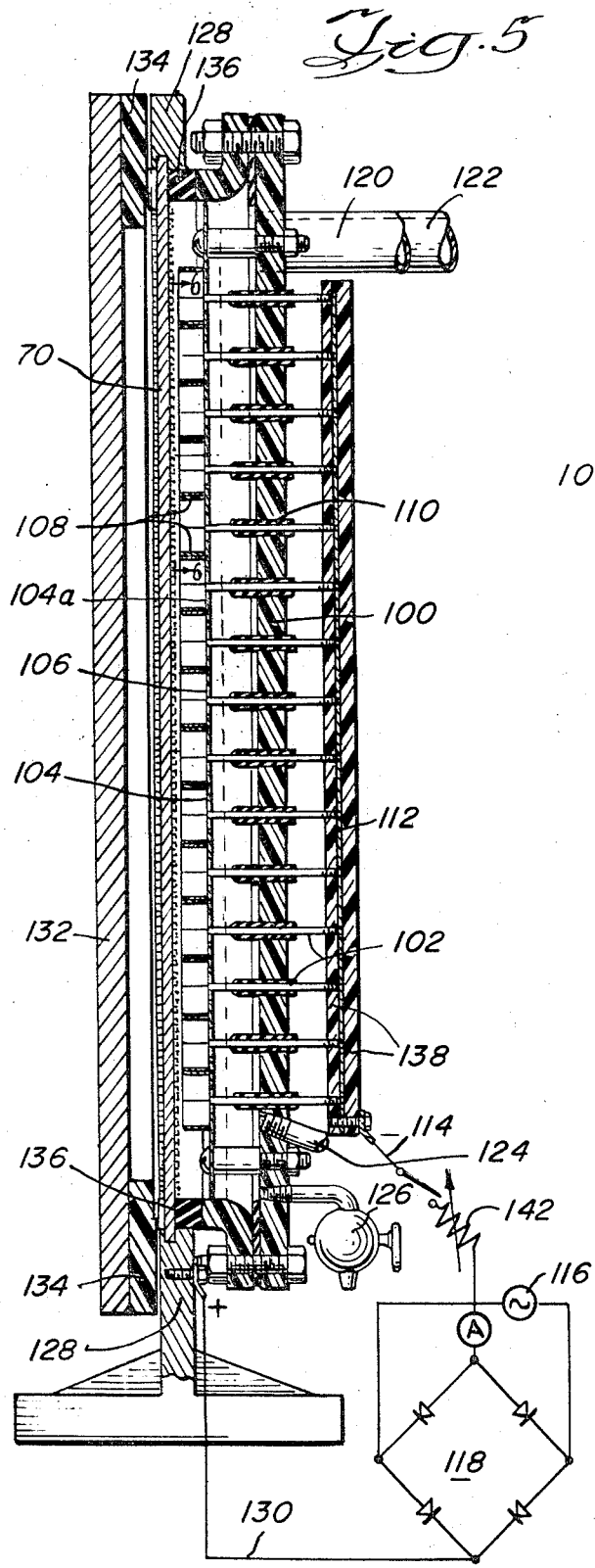
FIG. 5 is an elevational view, taken partially in section, of the apparatus of FIG. 4.

An apparatus in accordance with the teachings of the present invention which can be used to produce aperture masks is illustrated in FIGS. 1–3. The apparatus includes a fiberglass housing 40 having a plastic barrier 42 located therein and connected thereto by means of plastic fastening members 44. The barrier 42 defines a hole 46 which is centrally positioned with respect to the barrier. Connected to the front of barrier 42 is an annular collar 48, which is also formed of plastic material. The inner diameter of annular collar 48 controls the area of the workpiece that will be uniformly perforated. Both the hole 46 and the collar 48 cooperate to direct the ion flow uniformly over the area to be perforated.

A stainless steel rod 50, having a circular cross-sectional configuration, and having an axis which coincides with the axis of the hole 46, is positioned to the rear of the barrier 42. A portion of the rod 50 is surrounded by insulation 52, which may comprise rubber or an epoxy resin. The insulation is utilized to minimize "edge action" or the scattering of ions during the electrolytic perforating process. The rod 50 is positioned within a wall 54 defining an opening in housing 40. An annular member 56 (which may be formed of non-conductive material, thereby acting as insulation 52) is connected to the housing 40 to support the rod securely.

The housing has an inlet 58 and an outlet 60 which are connected to a supply of electrolyte solution. During the perforating process, the electrolyte solution is pumped into the housing 40 via conduit 58 and is removed therefrom via conduit 60. The housing is provided with a gas vent 64, and a drain 82, formed of a plastic material, is provided so that the electrolyte can be drained before the aperture mask (workpiece) is removed.

A workpiece-retaining member 62 is connected to the housing 40. The member 62 is formed of an electrically conductive material, such as copper, and is connected to the power supply via line 65 by means of a bolt 67.

A hinged enclosure 66 is provided for enclosing the electrolyte within the housing. To prevent leakage when the system is in operation, an annular rubber sealing gasket 68 is connected to the enclosure 66, and a gasket 68a is connected to housing 40.

The workpiece 70, which is positioned against the retaining member 62, forms the anode, and the rod 50 which is connected to the power supply 72 via line 63 and metal clamp 76, forms the cathode. The power supply 72 includes an alternating current source 78 which is rectified by means of a full-wave bridge rectifier 80. A variable resistance 75 is in line 63 to aid in regulating the current flow, which is measured by an ammeter 77, also in line 63.

With the exception of the electrodes 50 and 70, everything in contact with the electrolyte is formed of a non-conductive material, because any leakage of the ionic current will weaken the effectiveness of the system. All ions should flow through the hole 46, and the presence of other metal in the electrolyte distorts the desired ion flow path.

In the embodiment illustrated, a circular workpiece having a 21 inch diameter and formed of steel 0.006 inch thick, is perforated. The steel consists of the following components: phosphorus (0.04%), carbon (0.10%), manganese (0.25–0.50%), sulphur (0.05%), silicon (0.10%) and the remainder, iron. The perforations will be disposed about an 18.7 inch diameter area of the workpiece. To achieve the desired aperture wall configuration, the front end 48a of the collar 48 is spaced 1.2 inches from the surface 86 of the workpiece, and the front end 50a of the rod 50 is spaced 1.75 inches from the rear surface 42a of the barrier 42. The inner diameter of the collar 48 is 17 inches and the diameter of hole 46 is 7.5 inches. The stainless steel rod 50 has a 2.5 inch diameter, and the insulation 52 covers all but the front 2.5 inches of the rod 50. The distance between front end 50a of the rod from the surface 86 of the workpiece is 12.2 inches.

It is to be understood that the dimensions and various parameters specified herein relate to the illustrative embodiment of the invention, and are given merely as one example of various dimensions and parameters which may be utilized in accomplishing an electrolytic perforating technique for perforating articles.

The electrolyte 81 utilized in the operation is an aqueous solution of sodium chloride saturated at 90° F., in contact with solid solute, i.e., with a slight excess of solid sodium chloride present, and sulphuric acid added in the ratio of 20% by volume to the solution. A volume ratio of as low as 3% sulphuric acid may be utilized, but it was found that a higher volume ratio produced smoother aperture walls.

Prior to its insertion into the perforating apparatus, the workpiece 70 is coated on both sides thereof with a light-sensitive photoresist. Photographic masks are utilized, which are light transmissive except for opaque dots which correspond to the portions of the workpiece that will be apertured. The opaque dots are aligned on both sides of the workpiece, and the photoresist on both sides of the workpiece is exposed to light through the photographic masks. The photoresist is then developed and the unexposed portions are washed away in the conventional manner, leaving bare portions on opposite sides of the workpiece corresponding to the areas that will be apertured.

A sheet of non-conductive material, such as linen-Bakelite, is used to cover one side of the workpiece 70, while the other side is being perforated. The edges of the linen-Bakelite cover sheet 74 are taped to the edges of the workpiece 70, and the workpiece 70 is inserted into the receiving member 62 of the apparatus, with the uncovered side 86 of the workpiece facing the rod 50. The housing is then closed by fluid tight enclosure 66 which is clamped to the housing by fastening members 88. The electrolyte solution 81 is pumped into the housing 40, and when the housing is filled and the total surface of the workpiece to be perforated is in contact with the electrolyte, switch 80 is closed to allow the current to flow through the system.

After a predetermined amount of time, switch 80 is opened and the electrolyte is drained via drain 82. The workpiece, which has been grooved or partially perforated on one side 86, is then removed from member 62. The grooved side 86 is coated with an insulating varnish, and the cover sheet 74 is removed from the workpiece and is taped over the varnish-coated side 86. The workpiece is then inserted into the receiving member 62 with the opposite side 84 facing the rod 50. The electrolyte is again pumped into the housing 40 and switch 80 is closed to allow perforating from the second side 84.

After the grooves on side 84 have merged with the side 86 grooves, the switch is opened and the workpiece is removed from receiving member 62. Both the cover sheet 74, the varnish and the photoresist on both sides of the workpiece are removed, thereby completing the process.

Although it is possible to perforate the workpiece from one side only, it has been found advantageous to obtain grooving on a first side of the workpiece and then reverse the workpiece to complete the perforating. By perforating from both sides, the aperture edges on both surfaces of the mask are very smooth, while on the other hand, perforating from only one side occasionally results in very rough edges on the side of the mask which did not face the rod.

To achieve a more rapid operation, a magnetic field, normal to the plane of the workpiece, is introduced. It was found that a magnetic flux density of 12,000 gauss directed perpendicular to the plane of the workpiece reduced the perforating time very significantly, the other parameters remaining equal.

Figure 6:
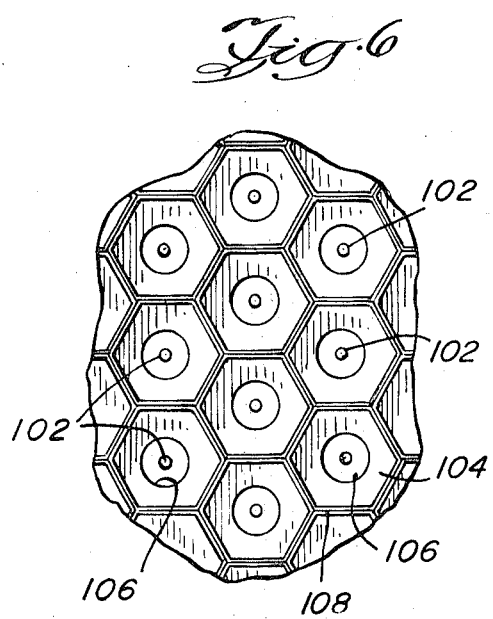
FIG. 6 is a fragmentary sectional view of a portion of the apparatus of FIG. 5, taken along the line 6—6 of FIG. 5.
Figure 4:
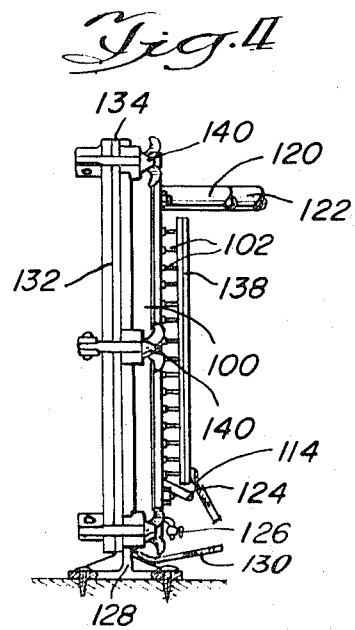
FIG. 4 is a side elevational view of another embodiment of an apparatus for making aperture masks.

Another embodiment of an apparatus embodying the teachings of the present invention, is illustrated in FIGS. 4–6. This apparatus has a number of parallel cathodes, each operating upon a certain portion of the workpiece, to cause perforation thereof.

The apparatus of FIGS. 4–6 includes a fiberglass housing 100 having positioned therein three hundred and twenty rods 102. Also located within the housing is a plastic sheet 104 having three hundred and twenty holes 106 positioned for directing the ions between the electrodes, and having three hundred and twenty collars 108 connected thereto, each collar being positioned concentrically about a respective hole 106. The collars are formed of plastic, and are shaped hexagonally (as shown in FIG. 6) so that the peripheries thereof are juxtaposed with one another.

The rods 102 are composed of stainless steel, and are received by holes in the housing 100. Each rod 102 is partially covered with insulation 110, which may comprise rubber or an epoxy resin. Similar to the FIGS. 1–3 embodiment, the insulation 100 is utilized to minimize "edge action" or the scattering of ions during the electrolytic perforating process.

The rods 102 are connected to a copper plate 112, having three hundred and twenty rod-receiving holes tapped therein. The plate 112 is connected to a source of current via line 114. The power source includes an A.C. supply 116 which is rectified through a full-wave bridge rectifier 118 in order to supply direct current to the system.

The housing includes a workpiece retaining member 128 for holding the workpiece 70. The retaining member 128 is formed of an electrically conductive material and is connected via line 130 to the power supply.

An inlet conduit 120 and an outlet conduit 122 are provided in the housing, and are connected to a supply of electrolyte solution. The electrolyte solution is pumped into the housing via conduit 120 and is removed via conduit 122. The housing is also provided with a gas vent 124, and a drain 126 is provided for drainage of the electrolyte from the housing.

The apparatus is provided with a hinged enclosure 132 for enclosing the electrolyte within the housing. Annular rubber sealing gaskets 134 and 136 are connected to the enclosure and housing, respectively to prevent leakage in the system.

In similarity with the FIGS. 1–3 embodiment, with the exception of the electrodes 70 and 102, everything in contact with the electrolyte is formed of a non-conductive material. Further, the plate 112 is coated with plastic sheets 138 for safety purposes.

The operation of the apparatus shown in FIGS. 4–6 is the same as the operation of the FIGS. 1–3 apparatus. The workpiece 70 is coated with a photoresist, exposed through photographic masks, and developed and washed so that bare areas of the steel sheet 70, corresponding to the aperture array, are provided. One side of the workpiece is covered with an insulating member, and the workpiece is inserted into the receiving member 128. The enclosure 132 is then connected to the housing 100 by fasteners 140, the electrolyte is pumped into the housing, and switch 142 is closed to allow current to flow through the system. The rate of current flow is determined by means of variable resistance 142.

After the side of the workpiece facing the cathodes is grooved, the housing is drained, and the workpiece is removed. The grooved side of the workpiece is then covered with an insulating varnish and with a strip of insulation, and the workpiece is returned to the housing so that the ungrooved side faces the cathodes. The electrolyte is again pumped into the housing and the operation is repeated, until the appropriate perforation has occurred. Again, the housing is drained via drain 126, and the workpiece is removed.

In the FIGS. 4–6 embodiment, a circular workpiece having a 21 inch diameter and formed of steel 0.006 inch thick is perforated. The steel is of the type mentioned above, and the perforations are disposed about an 18.7 inch diameter area of the workpiece. In this embodiment, from the workpiece the front end of each collar is spaced 1/8 inch, the front end of the rod 102 is flat and is spaced one inch, and the front surface 104a of the plastic sheet 104 is spaced 1 1/16 inch. Each of the collars 108 is 15/16 inch in length and the front end thereof is spaced 1/8 inch from the workpiece. The collars are each in the form of a hexagon inscribed within a two-inch circle, having an internal diameter (corner to corner) of 1.82 inches.

Each of the stainless steel rods 102 has a diameter of 1/4 inch and is covered with an insulation layer 110 that is 1/8 inch thick and terminates 7/8 inch from the front surface of the rod 102. The fiberglass sheet 104 is 1/16 inch in thickness and the holes are positioned concentrically about the end of the steel rod, and are 3/4 inch in diameter.

Although the embodiment illustrated shows all of the cathodes 102 connected to a common conducting plate 112, these cathodes can be connected by means of contact pins to a terminal strip so that individual electrical connections can be made to each cathode. In this manner, separate control over various areas of the workpiece can be achieved, by varying the current to each cathode. Further, aperture walls having certain configurations can be achieved by connecting an ultrasonic transducer to the workpiece and by applying an alternating current of ultrasonic frequency to the transducer, during the perforating operation.

Figure 7:
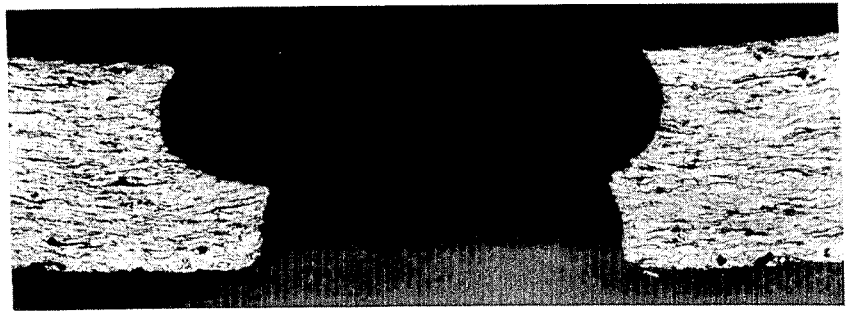
FIG. 7 is a microphotograph of a randomly selected aperture of an aperture mask produced in accordance with a prior art method.
Figure 8:
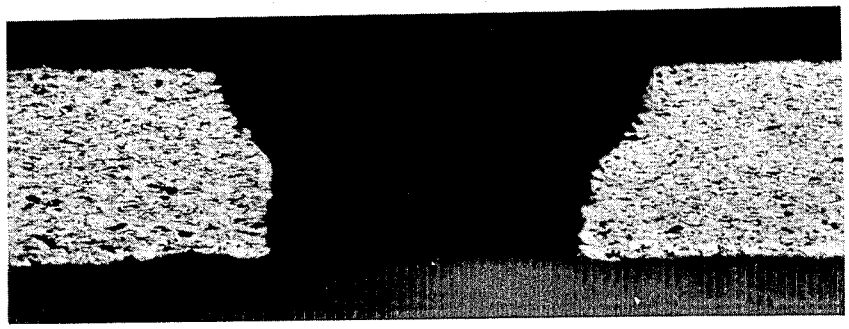
FIG. 8 is a microphotograph of a cross-section of a portion of the aperture mask produced in accordance with the method of the present invention.
Figure 9:
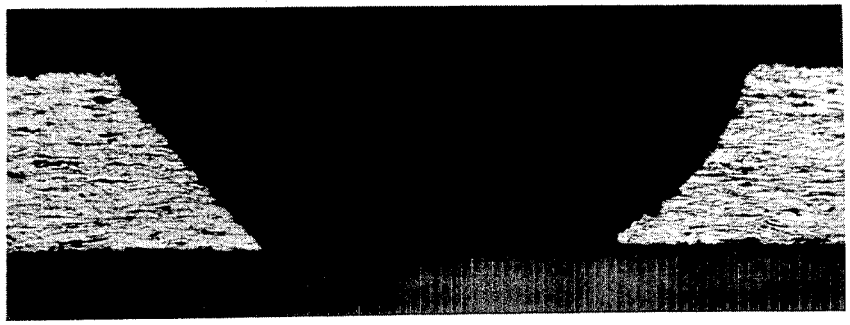
FIG. 9 is a microphotograph of the cross-section of a modified form of aperture mask produced in accordance with the method of the present invention.

Microphotographs showing the cross section of randomly selected apertures from aperture masks which have been produced using the above mentioned production techniques, are shown in FIGS. 8 and 9. For comparison purposes, FIG. 7 is a microphotograph of the cross-sectional configuration of one of the apertures of an aperture mask that was produced using a prior art production technique.

The microphotographs were obtained by impregnating the aperture masks with an epoxy resin in liquid form. After the resin hardened, the aperture masks were cut and the edges were lapped until a cross-sectional view along the central axis of a randomly selected aperture was available. The portions of the photographs which appear very dark comprise the hardened epoxy resin.

The prior art technique used to produce the aperture illustrated in FIG. 7 was as follows: A 0.006 inch thick steel sheet, of the type discussed above, having a four square inch surface area, was coated with a phosphate surface coating, as is conventional in prior art production techniques. Such a coating is necessary when the steel sheet is to be chemically etched. In order to prevent extremely serious surface and aperture wall distortions and irregularities. The phosphate coating was applied by soaking the steel sheet in a solution consisting of one gallon water with 4 oz. (volume) of "Diversey F–72" solution and 2 oz. (volume) of "Diversey D–105" solution added. These solutions are sold by the Diversey Corporation of Chicago, Ill. The steel sheet was soaked in the composition for four minutes, with the temperature of the composition being 160° F.

After the phosphor coating dried, the workpiece was further coated with a light-sensitive photoresist, which was exposed, developed and washed in a manner discussed above, leaving the steel bare in the aperture array. One side of the workpiece was covered with a material that is etchant-impervious, while the other side was etched by pumping a stream of an etching solution at the rate of one quart per minute and a temperature of 115° F. against the uncovered side of the workpiece. The etchant was composed of 10% nitric acid, 21% ferric chloride, 0.05% hydrochloric acid, and the remainder, distilled water. After etching for 3 minutes and 20 seconds on one side, the etched side was covered with the etchant-impervious material and the other side was etched in the same manner, for 6 minutes and 40 seconds, until the grooves on the second side met the grooves from the first side, and the intercept between them was circular. This conventional prior art technique of producing aperture masks is discussed in columns 4 and 5 of U.S. Pat. No. 2,663,821, in the name of Harold D. Law, entitled "Masked Target Kinescope."

The undercut that is produced by the prior art chemical etching technique is apparent from an inspection of the aperture wall shown in FIG. 7. The diameter of the opening at the top surface of the mask (as used herein, "top" surface and "bottom" surface refer to the respective surfaces as shown in FIGS. 7–9) is 0.018 inch and the diameter of the opening at the bottom surface of the mask is 0.014 inch. As is apparent from FIG. 7, a vacant portion having a diameter that is slightly greater than 0.019 inch underlies the top surface of the mask.

The aperture mask of FIG. 8 was produced as follows (Example A):

The steel sheet employed was the identical type as used in the FIG. 7 mask. The photoresist was applied, exposed, developed and washed in exactly the same manner as discussed above relative to the FIG. 7 workpiece, except that the photoresist was applied directly to the steel surface. Using the following technique, the mask of the present invention does not require a phosphate surface coating, as is required using prior art chemical etching techniques.

The steel sheet, now coated with the photoresist except for bare portions corresponding to the desired aperture array, was inserted into the apparatus illustrated in FIGS. 1–3, and the workpiece was perforated in accordance with the example operations discussed above in regard to this apparatus. The bottom surface of the workpiece faced the cathode (rod 50) for three and one-half minutes with a voltage of 37 volts applied to the system and with current of 295 amperes measured by ammeter 77. The workpiece was then reversed and the top surface faced the cathode for five minutes with a voltage of 38 volts applied and with a current of 305 amperes.

The resulting aperture, shown in FIG. 8, has an opening diameter at the top surface of the mask of 0.017 inch, and the diameter of the aperture at the bottom surface is 0.012 inch. The diameter of the aperture at the top surface of the sheet is the largest diameter of any vacant portion of the aperture.

An aperture having a diameter at the top surface of the sheet of 0.024 inch and a diameter at the bottom surface of 0.013 inch, with a continuous taper from the top surface to the bottom surface, is shown in FIG. 9 (Example B). The mask having these apertures was produced using the identical process used to produce the FIG. 8 aperture mask, except that immediately following the five minute exposure of the top surface, a 325 ampere current was allowed to flow for seven minutes, bringing the total exposure of the top surface to 12 minutes.

The process of the present invention can also be used to produce aperture masks which take a curved form. Additionally, the process can be used for all types of material removal from electrically conductive articles, even where total perforation is not required.

By allowing the current to flow for a suitable amount of time, which time is a function of, among other things, the material to be perforated, apertures having walls which are perpendicular to the plane of the workpiece can be obtained. Such a construction is not available using prior art chemical etching techniques, because of the undercutting that would occur. Further, the apertures produced in accordance with the teachings of the present invention can be of a diameter that is smaller than the thickness of the perforated material.

In contrast thereto, the apertures obtained using prior art chemical etching techniques are necessarily greater in diameter at some portion thereof than the thickness of the perforated material.

From the foregoing, it is seen that an article can be electrolytically produced comprising apertures which have the maximum diameter at one of the surfaces thereof, as contrasted, for example, with articles having an undercut surface formed by prior art techniques. It is to be understood that the embodiments of the invention shown and described herein are for illustrative purposes only. Various substitutions and modifications may be effected by those skilled in the art without departing from the spirit and scope and the novel concepts and principles of the invention.

What is claimed is:

1. In an electrolytic etching process for removing metal from a surface thereof that forms an anode and has a resist-pattern thereon, the improvement comprising the steps of: providing an acidic electrolytic solution, immersing a surface of the anode in the electrolytic solution, providing a cathode of a very small anode-facing surface dimension relative to the corresponding dimension of the immersed surface of the anode so that the cathode may be considered as a very small surface emitter relative to the immersed surface of the anode, directly exposing the anode to the cathode through the electrolytic solution, and restraining and focusing the field of straight-line emission of energy from the cathode to within a substantially straight-line ion-containing electrical field having an outwardly radiating outer surface and extending from the very small cathode dimension to the surface being etched, by directing emission from said cathode outwardly of said electrical field with an electrically insulative focusing nozzle.

2. In an electrolytic etching process as described in claim 1, and further including the step of applying ultrasonic vibrations to the surface being etched.

3. A process for etching sheet metal to produce color television aperture masks, including the steps of: immersing a metal sheet having a resist pattern thereon in an acidic electrolytic solution, electrically connecting the sheet to form an anode, providing a cathode of a very small anode-facing surface dimension relative to the corresponding dimension of the immersed surface of the anode so that the cathode may be considered as a very small surface emitter relative to the immersed surface of the anode, directly exposing the anode-metal sheet to the cathode through the electrolytic solution, and restraining and focusing the field of straight-line emission of energy from the cathode to within a substantially straight-line ion-containing electrical field having an outwardly radiating outer surface and extending from the very small cathode dimension to the surface of the anode-metal sheet being etched, by directing emission from said cathode outwardly of said electrical field with an electrically insulative focusing nozzle.

4. A process for etching sheet metal to produce color television aperture masks, including the steps of: immersing a metal sheet having a resist pattern thereon in an acidic electrolytic solution, electrically connecting the sheet to form an anode, providing a plurality of rod-shaped cathodes of very small cross-sectional dimension relative to the corresponding dimension of the immersed surface of the anode so that each of the cathodes may be considered as a very small surface emitter relative to the immersed surface of the anode, directly exposing the anode-metal sheet to the cathodes through the electrolytic solution, and restraining and focusing the field of straight-line emission of energy from each of the cathodes to within a substantially straight-line ion-containing electrical field having an outwardly radiating outer surface and extending from the very small cathode cross-sectional dimension to the surface of the anode-metal sheet being etched, by directing emission from each of said cathodes outwardly of said electrical field with an electrically insulative focusing nozzle.

5. In an electrolytic etching process for removing metal from a surface thereof that forms an anode and has a resist-pattern thereon, the improvement comprising the steps of: providing an acidic electrolytic solution, immersing a surface of the anode in the electrolytic solution, providing a cathode of a very small anode-facing surface dimension relative to the corresponding dimension of the immersed surface of the anode so that the cathode may be considered as a very small surface emitter relative to the immersed surface of the anode, directly exposing the anode to the cathode through the electrolytic solution, and restraining and focusing the field of straight-line emission of energy from the cathode to within a substantially straight-line ion-containing electrical field having an outwardly radiating outer surface and extending from the very small cathode dimension to the surface being etched, by directing emission from said cathode outwardly of said electrical field with an electrically insulative focusing nozzle defining an opening having a greater area than the anode-facing surface of the cathode.

References Cited

UNITED STATES PATENTS

| | | | |
|---|---|---|---|
| 2,073,679 | 3/1937 | Brown et al. | 204—297 |
| 2,469,689 | 5/1949 | Gresham | 204—15 |
| 2,861,932 | 11/1958 | Pohl | 204—141 |
| 3,013,956 | 12/1961 | Hugle | 204—143 |
| 3,066,084 | 11/1962 | Osterman et al. | 204—144 |
| 3,325,384 | 6/1967 | Frantzen | 204—143 |
| 3,359,192 | 12/1967 | Heinrich et al. | 204—143 |
| 1,519,572 | 12/1924 | Wolf | 204—25 |
| 2,859,166 | 11/1958 | Grigger | 204—279 |
| 2,971,117 | 2/1961 | Law | 313—86 |
| 3,146,368 | 8/1964 | Fiore et al. | 313—92B |
| 3,231,380 | 1/1966 | Law | 313—92B |
| 3,240,684 | 3/1966 | Martin et al. | 204—143 |
| 3,330,754 | 7/1967 | Trager | 204—224 |

FOREIGN PATENTS

| | | | |
|---|---|---|---|
| 1,009,518 | 11/1965 | Great Britain | 204—143 |
| 1,340,843 | 9/1963 | France | 204—143 |

OTHER REFERENCES

Wein, "Metal Finishing," October 1941, pp. 546, 547, and 548.

JOHN H. MACK, Primary Examiner

N. A. KAPLAN, Assistant Examiner

U.S. Cl. X.R.

204—141; 313—86, 92

UNITED STATES PATENT OFFICE
CERTIFICATE OF CORRECTION

Patent No. 3,578,574          Dated May 11, 1971

Inventor(s) Charles J. Trzyna and Thaddeus S. Trzyna

It is certified that error appears in the above-identified patent and that said Letters Patent are hereby corrected as shown below:

Column 1, line 5, change "Trzvna" to --Trzyna--;

Column 7, line 33, change "etched. In" to --etched, in--

Signed and sealed this 13th day of June 1972.

(SEAL)
Attest:

EDWARD M. FLETCHER, JR.        ROBERT GOTTSCHALK
Attesting Officer                Commissioner of Patents